(No Model.) 2 Sheets—Sheet 1.
P. W. GATES.
Hollow Chilled Bearing for Ball Joints of Stone Breakers and Other Machines.
No. 243,343. Patented June 21, 1881.
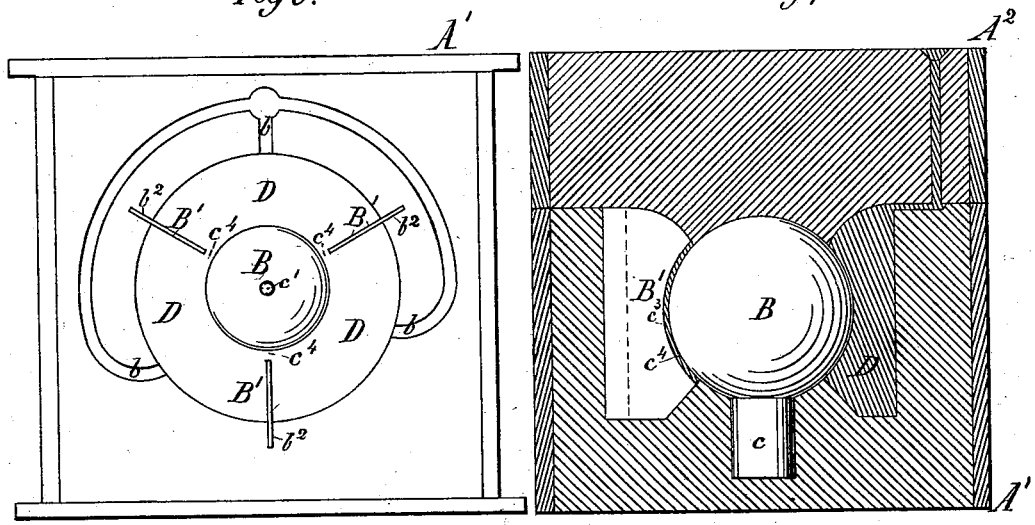
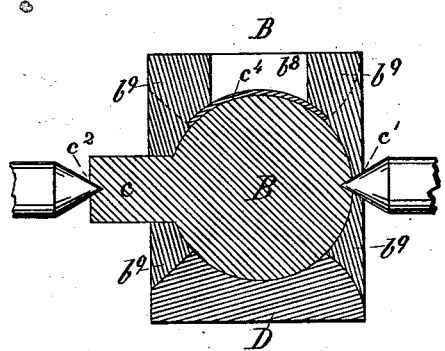
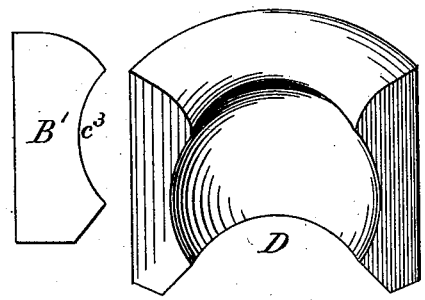
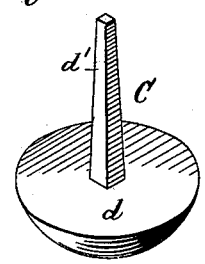
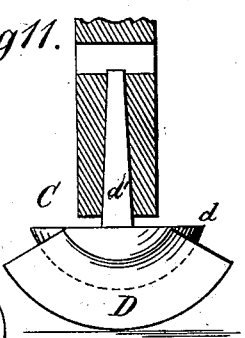
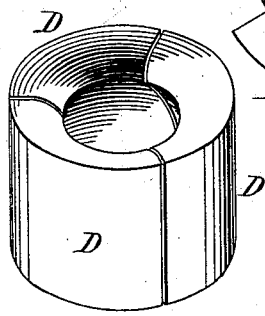
Witnesses:
J. F. Munson
J. P. Theo. Lang
Inventor:
Philetus W. Gates
by his atty.
Marion Fenwick Harmon (No Model.) 2 Sheets—Sheet 2.
P. W. GATES.
Hollow Chilled Bearing for Ball Joints of Stone Breakers and Other Machines.
No. 243,343. Patented June 21, 1881.
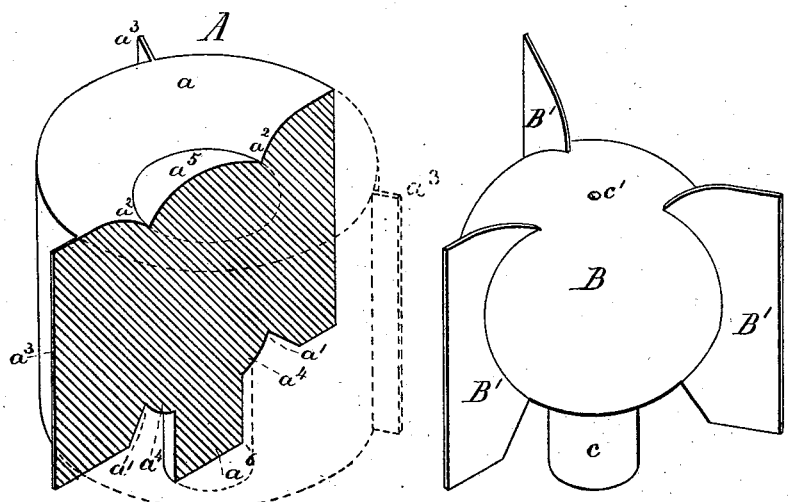
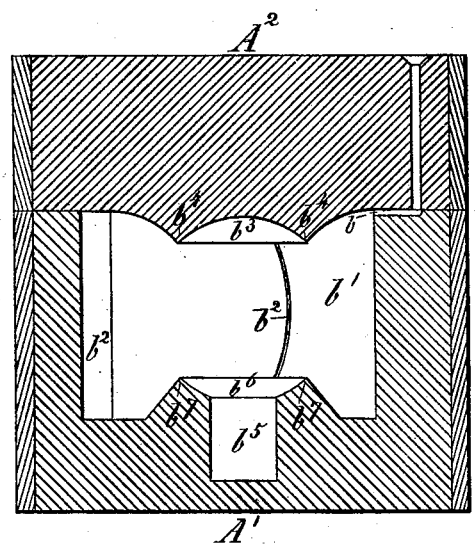

UNITED STATES PATENT OFFICE.

PHILETUS W. GATES, OF CHICAGO, ILLINOIS.

HOLLOW CHILLED BEARING FOR BALL-JOINTS OF STONE-BREAKERS AND OTHER MACHINES.

SPECIFICATION forming part of Letters Patent No. 243,343, dated June 21, 1881.

Application filed May 21, 1881. (No model.)

*To all whom it may concern:*

Be it known that I, PHILETUS W. GATES, a citizen of the United States, residing at Chicago, in the county of Cook and State of Illinois, have invented a new and Improved Hollow Chilled Bearing for Ball-Joints of Stone-Breakers and Other Machines, of which the following is a specification.

The nature of my invention consists in a bearing formed of segments separated radially, and having unitedly an interior surface which approximates very closely to a hollow sphere with its upper and lower parts cut off, and which surface is chilled, and has a bearing-contact upon the ball, which is fitted within the bearing, both above and below the horizontal axis of the ball.

My invention also consists in the bearing made with an exterior cylindrical surface which is unchilled, and an interior chilled surface which approximates very closely to a hollow sphere with its upper and lower portions cut off, said bearing having an interior form which gives it a bearing-contact both above and below the ball, which is fitted within it.

My invention also consists in the bearing hereinafter described, having its radial matching edges and its outer surface unchilled, while its interior surface, fitting upon the ball both above and below its horizontal axis, is chilled.

My invention also consists in the bearing for a stone breaker or crusher formed of segments which are cylindrical on their outside, and each a part of a sphere on their inside, said bearing being chilled internally and unchilled externally, and the same constituting an improved new article of manufacture.

This construction of bearing is very durable and offers but slight friction to the ball which fits and works within it. Such bearing, when used but a short time, becomes highly polished on its interior surface, it appearing as bright as a mirror, and it is found capable of enduring the most powerful wearing action without any perceptible diminution of its metallic body; whereas with other bearings not chilled, used in the same place on a stone-breaker—to wit, as a bearing for the fulcrum-ball of the crusher-shaft—the wear is so great that it has been found necessary to employ a means for compensating for the wear, and even with such compensating device the bearing has been found almost impracticable in machines for crushing limestone, and wholly useless for crushing granite and metallic ores. And in the manufacture of my chilled bearing it only requires about one-half day to make it, whereas in the manufacture of the unchilled bearing, with its compensating means, at least one week's work is required to produce the same; and even with this extra expense for labor the bearing is of but little use, it being necessary to make the segments too light, and the metal, on account of its softness on the inside of the hollow spherical bearing, is soon crushed out by the great wear and strain brought upon the bearing.

To manufacture the hollow spherical chilled bearing the means hereinafter described and shown by the accompanying drawings may be adopted; but these means form no part of my claim or invention under this patent, nor is my invention confined to the same.

In the accompanying drawings, Figure 1 is a perspective view of my improved hollow chilled ball-bearing as constructed for use in a stone-breaker or ore-crusher. Fig. 2 is a perspective view of one of the segments of the bearing shown in Fig. 1. Fig. 3 is a broken perspective view of a pattern first employed to produce the impression in sand contained in a flask and cope. Fig. 4 is a perspective view of a hard-metal chilling and pattern-ball and parting-plates which are introduced into the mold after the pattern-impression has been made in the sand and the pattern is withdrawn. Fig. 5 is a vertical section of a sand mold in a flask and cope as it appears after the pattern, Fig. 3, is withdrawn. Fig. 6 is a top view of the flask or lower section of the sand mold and its gates, the cope being removed and the hard-metal chilling and pattern-ball and parting-plates, with a casting for a segmental ball-bearing cast in the mold, being shown. Fig. 7 is a vertical section of Fig. 6 with the cope-section of the mold in position. Fig. 8 is a section of the casting for the chilled ball-bearing as it appears upon the ball on which it is cast after it is withdrawn from the mold, and when Babbitt or other suitable metal, for sustaining it while centered in a lathe for the purpose of having its cylindrical surface trued, is flowed into its hollowed ends and partly into its radial dividing-splits. Fig. 9 is a detail side view of a parting-plate used in the casting operation. Fig. 10 is a perspective view of a lead tool with iron stem, whereby emery and oil are applied in polishing the concave surface of the respective segments of the said bearing. Fig. 11 is an elevation and partial section, showing a segment of the chilled bearing, and also the polishing-tool and its stock.

From the figures of the drawings it will be seen that the pattern A, for producing the impression in sand contained in a flask, A', and cope $A^2$, consists of a cylindrical body portion, $a$, with hollowed ends $a'$ $a^2$, radial wings $a^3$ extending out beyond the circumference of the body portion $a$, partly-spherical end portions, $a^4$ $a^5$, and a centering cylindrical stem, $a^6$. This pattern is centered by its stem in the mold in any suitable manner, and sand is rammed around it until the flask A' is full. Gates $b$ are then formed, and the cope $A^2$ is adjusted in position upon the flask A' and sand rammed into it until it is full. This operation produces a mold in sand consisting of a cylindrical chamber, $b'$, narrow radial channels $b^2$, a concave or partly-spherical depression, $b^3$, a conical seat, $b^4$, a cylindrical socket, $b^5$, a concave or partly-spherical depression, $b^6$, and a conical seat, $b^7$, as shown in Fig. 5.

A perfectly smooth and true ball, B, of suitable hard metal, and having a stem, $c$, is provided. This ball has centering-sockets $c'$ $c^2$; and in connection with the ball metallic parting-plates B', made with a concave edge, $c^3$, and coated or japanned over their surfaces, are also provided. These plates are coated in order that the casting metal shall not stick to them, and they are adjusted close to the ball, by hand or otherwise, as shown in Fig. 4, so as to be passed into the flask portion of the mold without touching the sand surrounding the radial channels $b^2$. The ball and plates are set down into the sand-mold, the stem of the ball fitting into the socket $b^5$ and the plates into the radial channels $b^2$, while the ball itself stands in the chamber $b'$. Thus adjusted the ball occupies a true central position in the chamber, and the plates are radial to the ball; and when the plates are in the mold a slight radial movement outward is given to them, so as to set them a little off from the ball, and to allow for this adjustment the channels $b^2$ are made of a sufficient depth in a radial direction at the time they are made with the pattern. By this adjustment of the plates narrow webs $c^4$ will be formed between the segments of the bearings in the casting process, and the several segments will thus be temporarily united, notwithstanding the fact that the plates keep them separated at all other points. It is important to have the segments of the casting remain thus united, as it is necessary to center the same in a lathe for the purpose of turning off the outside cylindrical surface, for the purpose of making it true.

The casting to form the improved bearing D is produced by flowing molten metal along the gates $b$ of the sand-mold into the vacant parts of the mold. In the casting operation the casting for the improved bearing D has its outer surface and radial parting-surfaces left unchilled, the sand mold and the coated parting-plates not acting to chill these surfaces, while its interior or nearly-spherical surface is chilled, the hard-metal ball serving to impart the chill thereto. The casting having been molded, is removed from the mold with all its segments united in a temporary manner by the webs $c^4$ of metal run in between the ball and the inner concave edges of the parting-plates. The parting-plates are now withdrawn, and into the hollows at the ends of the casting, as well as into the radial parting-splits $b^8$, is flowed Babbitt metal $b^9$, or other suitable metal, for the purpose of forming centering supports. Thus prepared, the casting is centered in a lathe and its cylindrical surface turned off true. The segments of the casting are now broken apart at the metal webs $c^4$, and the rough or fractured edges of the segments ground off with an emery-wheel. The separated segments are then polished on their concave or partly-spherical surface by means of emery and oil, and for doing this a tool, C, consisting of a soft-lead head, $d$, in form of part of a sphere, and a steel or iron shank, $d'$, is provided, and the same is secured in the stock of an ordinary drill. With this tool and emery and oil the partly-spherical interior surface of the respective segments is polished for a few minutes, and thereby completed.

The ball-bearing D described is specially adapted by its construction and form shown for use with a ball on the head of a stone-breaker or crusher-shaft; but by changing its exterior form it might be adapted for other machines.

When the bearing D is used with the ball on a stone-breaker shaft, such ball, made of forged wrought iron or steel as a part of the shaft, is inclosed by the several segments of the improved bearing, and the segments, while around the ball, are inserted into a sustaining-box formed on the arched capping portion of the frame of the crushing-machine in the usual manner, except that no wear-compensating device is employed between the improved bearing and the said sustaining-box of the frame; but this special mode of employing the bearing in a stone-breaker is not herein claimed, as the same has been granted to me in an application heretofore made by me.

Prior to my invention it has been common in the arts to impart a chill to bearing and wearing surfaces, and therefore my invention is not to be regarded as covering this well-known thing, but as relating to a specific bearing for ball-joints, such bearing being internally chilled and in form of a hollow sphere with its upper and lower ends cut off, and formed of a suitable number of segments, which bear upon the ball both above and below its horizontal axis—in fact, fitting nearly the entire surface of the ball, and giving it an almost complete circumferential contact and bearing-support.

Another feature of novelty in the bearing invented by me lies in its being internally chilled and of spherical form internally, while it is of cylindrical form externally, and unchilled on its cylindrical surface; and another feature of novelty is in having the bearing of spherical form internally and chilled internally, and also of cylindrical form externally and unchilled on such cylindrical surface, and also having the radial matching edges of the segments forming it unchilled.

A ball-bearing such as I have described and shown was never before produced or used in the arts, and it was only after very considerable thought and study that I was enabled to produce the same.

What I claim as my invention, and desire to secure by Letters Patent, is—

1. The segmental cast bearing for the ball of socket-joints, having form which gives it a bearing-contact upon the ball above and below its horizontal axis, and also an interior chilled surface nearly in the form of that of a hollow sphere, and an exterior unchilled surface, substantially as and for the purpose described.

2. The segmental cast bearing for the ball of socket-joints, having an interior form which gives it a bearing-contact upon the ball above and below its horizontal axis, and also an interior chilled surface nearly in the form of that of a hollow sphere, and a cylindrical exterior unchilled surface, substantially as described.

3. The segmental cast bearing having a form which gives it a bearing-contact upon the ball above and below its horizontal axis, and an interior chilled surface nearly in form of that of a hollow sphere, and the radial edges and periphery of its segments unchilled, substantially as described.

4. The improved new article of manufacture, consisting of the bearing made of segments radially separated, and having unitedly an interior chilled surface which is in form of a hollow sphere with its upper and lower portions cut off, while its exterior surface is cylindrical and unchilled, the said bearing having a bearing-contact above and below the horizontal axis of the ball, which is fitted in it, and adapted to fit in a cylindrical support of the machine in which it is placed, substantially as and for the purpose described.

PHILETUS W. GATES.

Witnesses:
GEORGE SCOVILLE,
ROBT. RITCHIE.